United States Patent [19]

Watkins

[11] 4,199,921
[45] Apr. 29, 1980

[54] HORSE ANTI-BUCKING TRAINER

[76] Inventor: Harold E. Watkins, 4205 Wolflin Ave., Amarillo, Tex. 79106

[21] Appl. No.: 913,343

[22] Filed: Jun. 7, 1978

[51] Int. Cl.² .......................... B68B 1/00; A01K 15/00
[52] U.S. Cl. ........................................... 54/71; 119/29
[58] Field of Search ......................... 119/29; 54/1, 71

[56] References Cited

U.S. PATENT DOCUMENTS

| | | | |
|---|---|---|---|
| 3,161,005 | 12/1964 | Ackerson | 54/71 |
| 3,319,605 | 5/1967 | Early et al. | 119/29 |
| 3,616,595 | 11/1971 | Townsend | 54/1 |
| 3,733,530 | 5/1973 | Labart et al. | 119/29 X |
| 3,874,339 | 4/1975 | Coulbourn | 119/29 |

*Primary Examiner*—Louis G. Mancene
*Assistant Examiner*—Robert P. Swiatek
*Attorney, Agent, or Firm*—Blair, Brown & Kreten

[57] ABSTRACT

Disclosed herein is an apparatus for training horses. The apparatus contains an induction coil powered by batteries. It may be activated manually, remotely, or automatically by means of an inertia switch. It contains a neon light that operates whenever current flows from the induction coil. This indicator light shines brightly whenever the current passes from one electrode to the other. It serves to indicate when the unit is operating and in adjusting the inertia switch to the gravity force needed for its activation. A series of resistors and a potentiometer offer a selection of voltages after the current emerges from the induction coil. The unit is mounted on the rear billet of the saddle. The current reaches the horse through electrodes which protrude through the billet. These electrodes remain in contact with the horse. The unaltered high voltage current is used to teach a horse not to buck.

7 Claims, 8 Drawing Figures

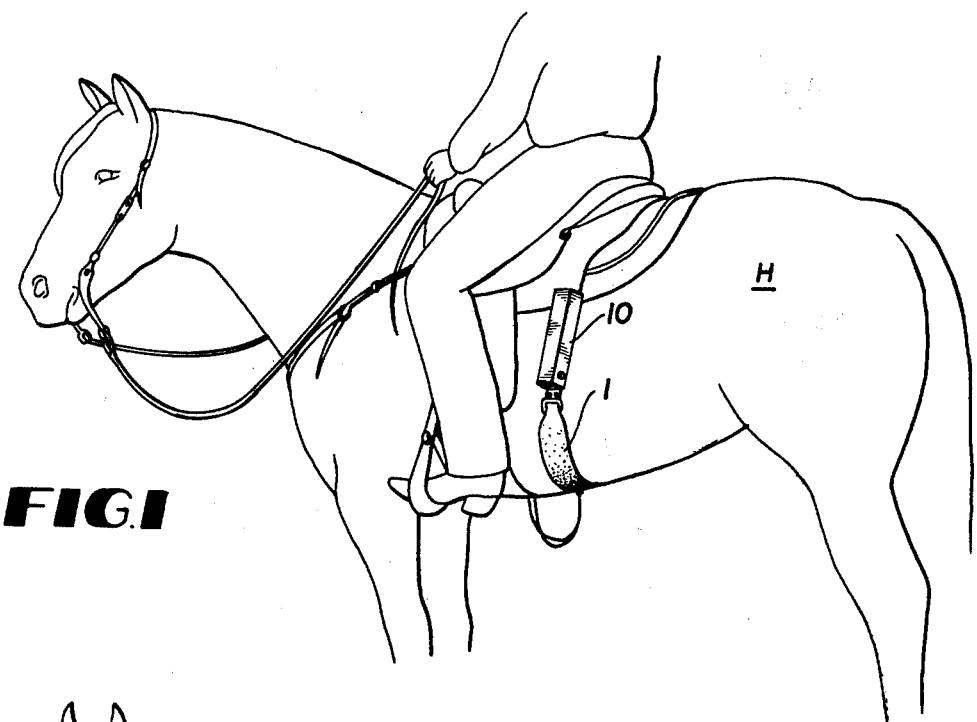
FIG.1
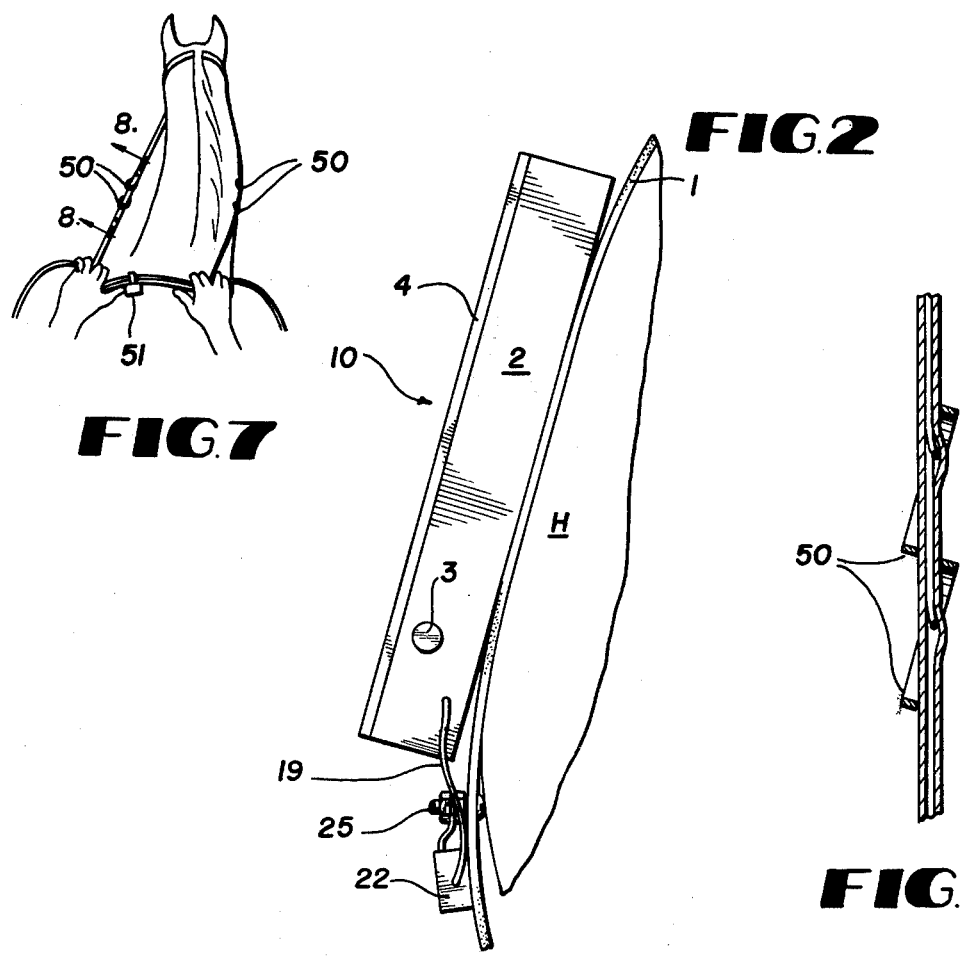
FIG.2
FIG.7
FIG.8

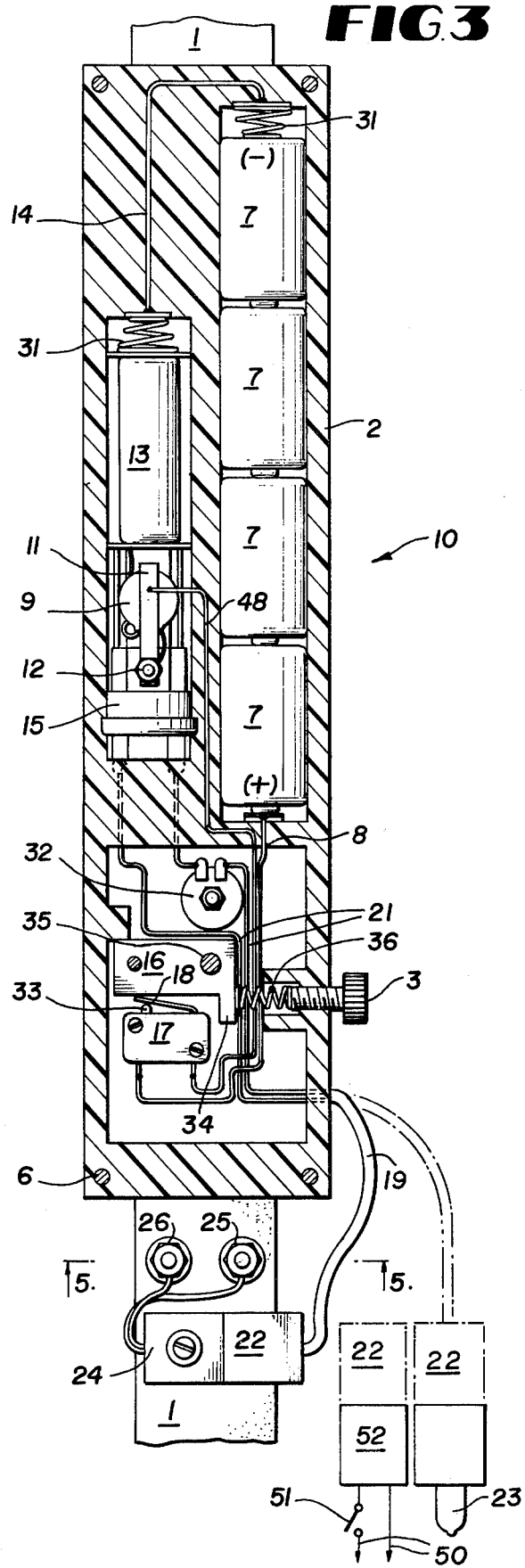
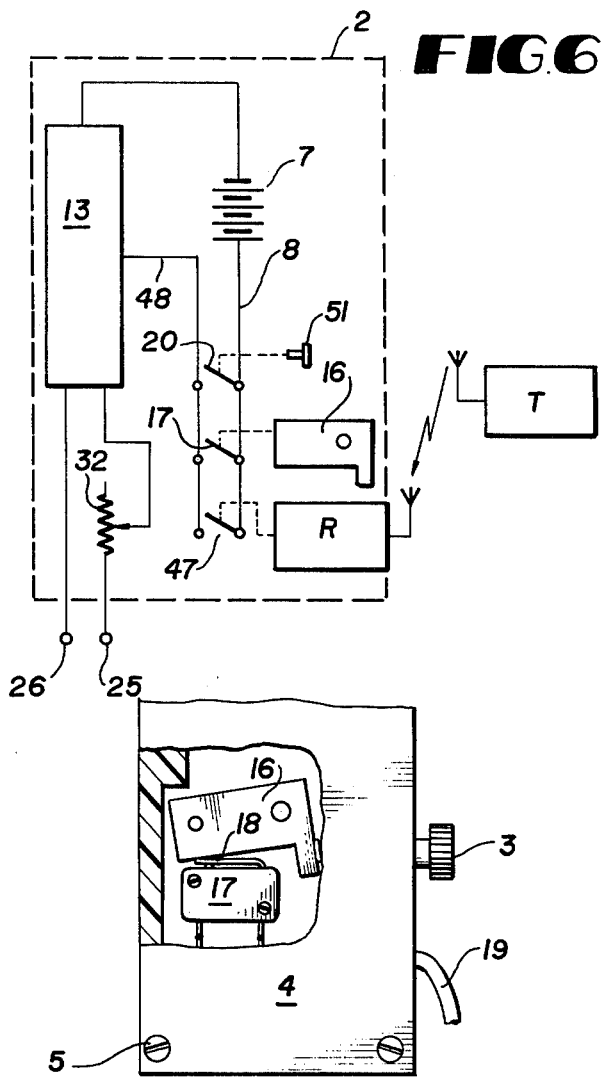
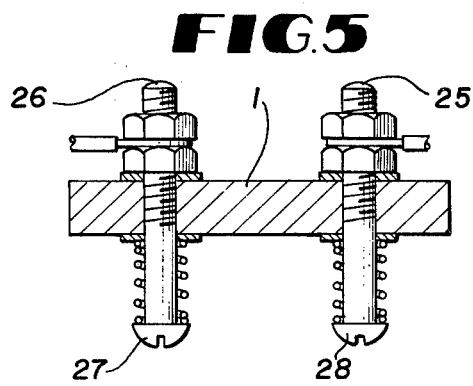
FIG.3
FIG.6
FIG.4
FIG.5 ic # HORSE ANTI-BUCKING TRAINER

SUMMARY OF THE INVENTION

Research of the learning process of animals shows that they will learn quickly when reinforced by a mild electrical shock. Heavier shocks inhibit the learning process.

The use of a mild shock, for example, is used in the training of a horse to respond to pressure of the rein against his neck. The circuitry is laminated in the reins and two electrodes encircle each rein. A button switch on the bridle rein is used to activate the unit. The mild shock is delivered to the horse's neck upon contact of the electrodes. Thus the training to respond to light rein pressure is enhanced by the reinforcing mild electrical shock. A horse can also be trained to travel at a gait that is comfortable to the rider. This is done by using the inertia switch, properly adjusted, and a mild shock. The unit, mounted on rodeo bucking stock and with the inertia switch immobilized, can be used to enhance the animal's training. This is done by activating the unit with the remote switch to provide the necessary stimuli.

The heavy shock is used to correct and prevent undesirable behavior of a horse. The remote switch is used to correct biting, kicking, and fighting. The inertia switch is used in the correction of bucking. It is adjusted so as to be responsive to the gravity load which is produced only when the horse hits the ground with great force while bucking. The horse is made to buck, without a rider, by means of a rope pulled tight in his flank. By bucking, the horse soon learns that he punishes himself, whereas, previously his bucking punished only the rider. In a matter of a few minutes the horse will refuse to buck even with the provocation used in rodeos for that purpose.

BACKGROUND OF THE INVENTION

Field of the Invention

A bucking horse has a limited value except for use in rodeos. The applicant cites the following patents: U.S. Pat. Nos. 3,319,605 Early et al, 3,616,595 Townsend, 3,733,530 Labart et al and 3,874,339 Coulbourn. They are all directed to various training devices in which an animal is to respond to a stimuli. None provides a technique and specific apparatus to cause a horse to refuse to buck.

It has been determined that the strongest impression upon an animal's mind is made as a result of a terrifying experience. This apparatus that is to be delineated in the following specification utilizes electric shock to provide such an experience. A nine-year-old horse that had been retired from saddle service because of his bucking was conditioned with this device. Within one hour he refused to buck even with the provocation used in rodeos to produce bucking. The animals that have been conditioned with this anti-bucking device have been ridden regularly since its use. They have shown no tendency to buck in any kind of situation, without the training device. Therefore, they have become reliable, biddable, workable animals.

OBJECTS

Accordingly, this invention contemplates as an objective to provide a device which discourages a horse or similar animal from bucking, or landing on the ground stiff legged.

Another object of this invention contemplates providing a control system which can selectively instruct the horse and alter its behavior patterns.

These and other objects will be made manifest when considering the following detailed specification and drawings.

BRIEF DESCRIPTION OF THE DRAWINGS

FIG. 1 is a general depiction of the training device disposed upon a horse;

FIG. 2 is a side view of the training element showing the placement of the electrical contacts against the horse;

FIG. 3 is a top plan view of the anti-buck training device showing the working components and their interrelationship;

FIG. 4 shows a particular detail of FIG. 3 in which an inertia switch is activated;

FIG. 5 is a sectional view taken along lines 5—5 of FIG. 3 showing the electrodes;

FIG. 6 shows a schematic of the present invention and various electrical options;

FIG. 7 shows a reining technique utilizing the apparatus according to the present invention; and FIG. 8 is a sectional view taken along lines 8—8 of FIG. 7.

DESCRIPTION OF THE PREFERRED EMBODIMENTS

Referring to the drawings now wherein like reference numerals refer to like parts throughout the various drawings, reference numeral 10 is directed to the training device according to the present invention.

The training device 10 is disposed upon the rear billet 1 connected to a saddle and is placed in proximate relationship to a horse H. Contact elements 25 and 26 extend on and through the billet and terminate in electrodes 27 and 28 which touch the horse, as best seen in FIGS. 2 and 5. The contact electrodes 27 and 28 extend through the billet 1 and are spring biased to assure that they will remain in contact with the horse during all modes of horse motion.

FIG. 3 best depicts the mechanics of the training device in which the cover 4 has been removed and the components disposed within the casing 2 are there revealed. It is to be noted that the apparatus disposed on billet 1 comprises a plurality of batteries 7 serially oriented with polarity as shown, and the negative terminal 14, extending away from the battery series, communicates with induction coil 13 through biasing means 31 at one extremity of the induction coil. Another wire 8, FIG. 6, connects the positive terminal of the battery system via three switches 17, 20 and 47 to the induction coil through a wire 48 which terminates in a resilient contact strip 11 of FIG. 3. Whereas FIG. 3 shows only switch 17, FIG. 6 makes it clear that switches 20 and 47 can be provided. Switch 17 for example may be an automatic type switch in which the switch responds to preset criteria as will be hereinafter explained, or it may be a manual switch 20 actuable by the rider, or it may be a remote controlled switch 47 which can be actuated by an observer remote from the horse.

In any event, wire 48 through the contact strip 11 coacts with the induction coil 13 through element 9 and the wiper element or flexible strip 11 is connected to an outlet type of device 15 through a fastening nut 12. The outlet device 15 is then connected to an indicator light 23 through wires 21 as clearly shown in the figures.

However, disposed along one of the wires 21 is a variable potentiometer 32 which may have a continuous wiper type motion for providing an infinite range of resistive control through the wires 21 or may have in its stead five positions for example with different resistances at each stop so that various voltages will be transmitted through the wire in response to the potentiometer setting.

The inertia switch 17 has as stated two wires connecting this switch which when contact arm 18 makes contact with terminal post 33 will complete the circuit. The contact arm 18 is caused to press down through a pivoting link 16 which has an orthogonally offset arm member 34 and is pivoted at point 35 so that it pivots around point 35. The orthogonally offset arm 34 abuts against a spring element 36 having an adjustable thumb screw 3 and this serves to vary the amount of force necessary in a vertically downward direction that will cause link 16 to pivot and press and thereby close the contact arm 18 against the post 33 to complete the circuit.

The indicator light 23 is removeable so that the circuit can be made continuous after testing, by plugging the contact pin block member 22 into receptor 24 disposed on billet 1 as is shown in FIG. 3. FIG. 4 shows the switch element 17 in its energized state. The block member 24 which receives the pin block member 22 provides a reliable electrical connection so that the two wires extending outwardly therefrom can be fastened to terminal posts 25 and 26 so that when the horse exceeds the setting on the inertia switch 16, 17 and 18 as adjusted by thumb screw 3 he will receive a shock of sufficient voltage to discourage him from bucking again. FIGS. 3 and 4 show the screw elements 5 which fasten to case 4 onto the body member 2 through holes that are threaded 6.

FIGS. 7 and 8 along with a portion of FIG. 6 show a reining device comprised of contact rings 50 disposed on the reins and operatively connected to pushbutton 51 of switch 20. In use, contact pin 22 is shunted to switch 51 through block member 52. The rings, pushbutton, and switch are connected to the batteries and coil as shown in FIGS. 3 and 6 and it is apparent that contact of the rings on only one side of the horse's neck will encourage his proper response to reining.

Finally, FIG. 6 contemplates training a horse from bucking by remote control whereby the transmitter T acts with receiver R to energize switch 47.

Having thus described the invention it will be apparent that there has been provided a means for assuring that a horse that attempts to buck will be provided with stimuli sufficiently unpleasant to discourage any further attempts to proceed bucking and further while the structure shown here is exemplary, it is not seen to be limiting in the scope and spirit of the invention as delineated hereinabove and as specified in the claims.

What is claimed is:

1. An anti-buck horse trainer comprising a pair of electrodes each having opposite polarity disposed on a billet in proximate relation to the animal to be trained, voltage means formed from a battery powered induction coil to provide a potential difference of voltage between the two electrodes disposed on said billet, and actuation means communicating with said voltage means to provide the voltage differential to the horse upon bucking wherein said actuation means is defined by an adjustable inertia switch.

2. The device of claim 1 in which the inertia switch can be varied as to its sensitivity.

3. The device of claim 2 in which there is an indicator light means to assure proper adjustment of the inertia switch and to indicate said voltage means is operating.

4. The device of claim 2 in which the voltage means is adjustable through a potentiometer.

5. The device of claim 2 in which said inertia switch comprises a pivoted link having a face thereon which closes a contact arm, an orthogonally offset arm extending from said link biased against a spring and thumbscrew for adjusting the tension on said pivoted link.

6. The device of claim 1 in which said actuation means includes a remote control energizer which overrides said inertia switch.

7. The device of claim 1 in which said actuation means is energizable by the rider of the horse by means of a push button which overrides said inertia switch.

* * * * *